United States Patent [19]
Le Master

[11] 3,727,339
[45] Apr. 17, 1973

[54] ADJUSTABLE FISHING LURE

[76] Inventor: Harold A. Le Master, 701 N. Greenwood Ave., Clearwater, Fla. 33515

[22] Filed: June 9, 1971

[21] Appl. No.: 151,315

[52] U.S. Cl. ............................. 43/42.22, 43/42.47
[51] Int. Cl. ............................................ A01k 85/00
[58] Field of Search ................... 43/42.22, 42.47, 43/42.03

[56] References Cited

UNITED STATES PATENTS

| | | |
|---|---|---|
| 2,808,677 | 10/1957 | Dusablon et al. ............... 43/42.22 |
| 1,615,803 | 1/1927 | Pflueger ........................... 43/42.47 X |
| 1,948,005 | 2/1934 | Pflueger ........................... 43/42.47 |
| 2,274,596 | 2/1942 | Fink ................................. 43/42.22 |
| 2,495,134 | 1/1950 | Roberts ............................ 43/42.22 |
| 2,627,136 | 2/1953 | Sinclair ............................ 43/42.47 |

Primary Examiner—Antonio F. Guida
Assistant Examiner—Daniel J. Leach
Attorney—Lloyd J. Andres

[57] ABSTRACT

An adjustable fishing lure of the floater type, of small fish appearance, having an activating member attached thereto comprising two arcuate shaped planar deflecting vanes of different size joined in a common junction with a predetermined angle therebetween. The vanes are transversely positioned in a V-shaped mouth of the lure facing forward with the larger vane uppermost and the smaller vane lowermost for activating the lure on and near the surface of the water when motivated by a line. The inversion of the vane will cause the lure to produce wobbly swimming motion underwater when motivated.

1 Claim, 7 Drawing Figures

PATENTED APR 17 1973 3,727,339

INVENTOR.
HAROLD A. LEMASTER
BY Lloyd Andres

ADJUSTABLE FISHING LURE

This invention relates in general to fishing lures and more particularly to a hollow molded plastic lure simulating a small fish in color and shape including a simple frontal vane which may be selectively rotated to each of two positions, for agitated surface fishing or underwater wobbling agitation.

Prior lures were not provided for dual function, and although various motions have been applied to certain lures to agitate or wobble same in the water, the mechanics required often caused the lure to lose its fish-like identity or operation.

The present invention presents a solution by providing a floater type lure with a close resemblance to a small live fish in color and shape and includes a simple adjustable vane for using the lure in an agitated manner on the surface of the water or by a simple inversion adjustment provides for under-water wobbling activity when motivated by a line.

A principal object of the invention is the provision of an invertible transparent member in the mouth of the lure which has a pair of opposite upper and lower deflecting vanes of different area, one of which is for use as a surface lure and the other for use as an underwater lure.

These and other objects and advantages in one embodiment of the invention are described and shown in the following specification and drawing, in which.

Figure 1:
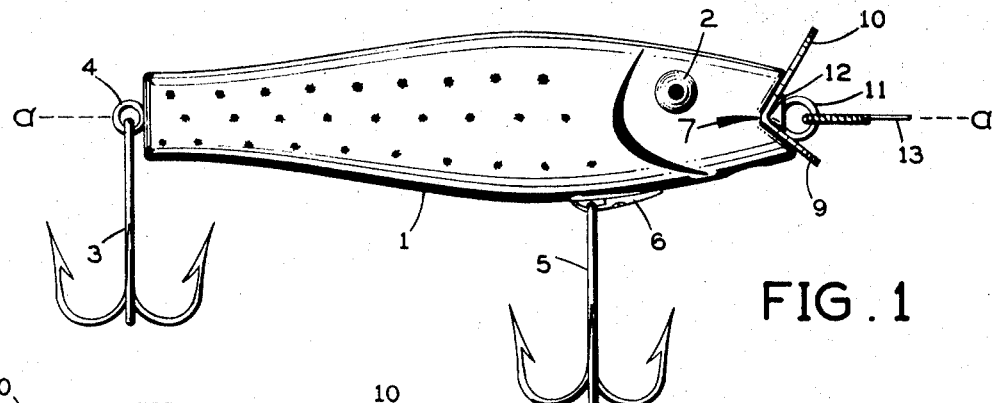
FIG. 1 is a side elevation of a fishing lure.
Figure 2:
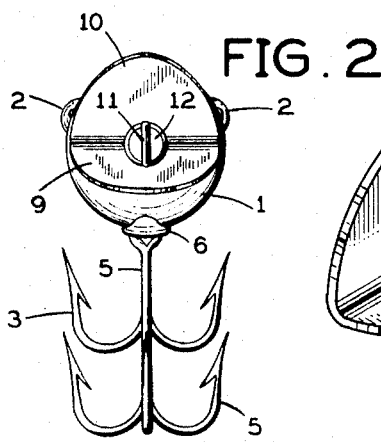
FIG. 2 is a front elevation thereof.
Figure 3:
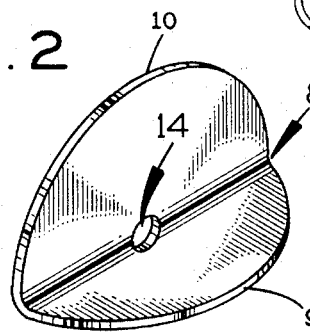
FIG. 3 is a perspective enlarged view of an activating member shown in FIGS. 1 and 2.
Figure 4:
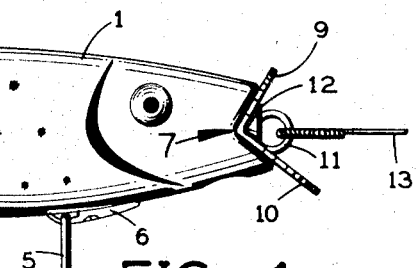
FIG. 4 is a fragmentary view of the lure shown in FIG. 1 with the activating member inverted.

The lure, illustrated in FIG. 1, has a hollow body 1 injection molded in two parts from one of several well known plastic materials, having cavities therein, and hermetically sealed together at a transverse junction. The outside surface of the body is multi-colored to simulate a fish, with gill and mouth openings, including the use of artificial eyes 2. A triple prong hook 3 is secured for limited movement to the rear end of the body by a screw 4 threaded along the peripheral axis a—a of the body. A second triple prong hook 5 is secured for limited movement to the underside of the body 1 by a clip 6. A simulated mouth or transverse V groove or recess 7 in the forward end of the body is adapted to retain an invertible activating member 8 which is preferably formed from transparent plastic material with a lower vane 9 and an upper vane 10. A screw having an eye 11, with a conical washer 12 thereon, is threaded into the body along the axis a—a for securing and distributing the pressure on the vanes of the activating member, as shown in FIGS. 1 and 2. The eye 11 is used to secure the end of a line 13 to the lure for motivating same in a well known manner.

Figure 5:
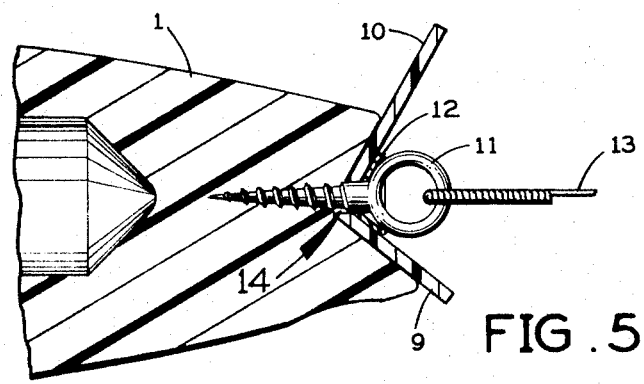
FIG. 5 is an enlarged cross sectional fragmentary elevation taken along the principal axis of the lure shown in FIG. 1.

FIG. 5 illustrates the assembly of the activating member with the screw inserted through a central hole 14 at the junction of the two vanes with the conical washer 12 positioned between the eye of the screw and the outer surface of the activating member. Thus it is apparent from FIG. 5 that to invert the vanes 9 and 10, the screw is unscrewed sufficiently to rotate the activating member a half revolution, such as illustrated in FIGS. 6 and 7.

Figure 6:
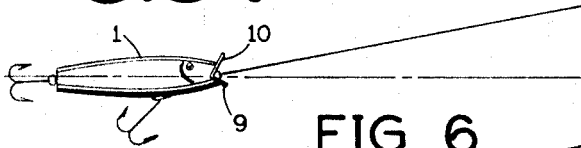
FIG. 6 illustrates the activation of the lure shown in FIG. 1 on the surface when the activating member is in its surface position.
Figure 7:
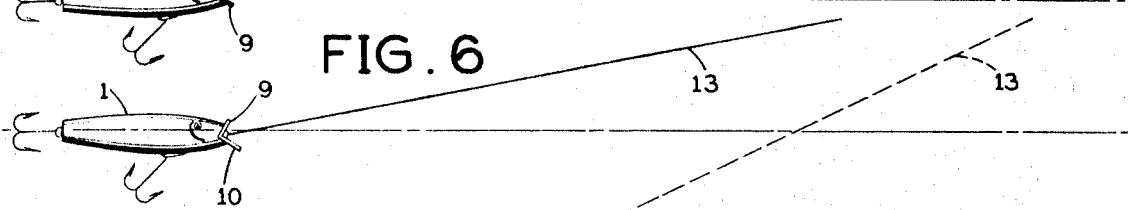
FIG. 7 illustrates the downward activation of the lure by the line when the activating member is inverted, as shown in FIG. 4.

When the large vane 10 is secured in the upward position on the body 1 of the lure, and the bait motivated forward by line 13, the action of the lower activating member impinging against the water will simulate a jumping action of a frog or fish near the surface of the water, which is attractive to certain fish, whereas when the activating member is inverted, as shown in FIG. 6 with vane 10 in the lower position and motivated forward by the line, the lure will descend in the water with a wobbly swimming motion, which also presents a lifelike action to nearby fish.

It is to be noted that a single vane may be successfully substituted for the dual vanes 9 – 10 by securing either of the vanes 9 or 10 alone in the recess 7 when it is desired to operate the foregoing described lure for a singular purpose.

Certain modifications in construction are intended to come within the teachings and scope of the above specification.

Having described my invention, I claim:

1. A fishing lure of the floating type comprising a body made from two molded plastic members having cavities therein and sealed together in a transverse junction and shaped and colored to simulate a fish symmetrical about a longitudinal axis, a transverse recess having a V shape across the front end thereof in the form of a predetermined obtuse angle simulating a mouth, said body including a plurality of fishhook means secured thereto, an activating member of transparent plastic material of substantially uniform thickness and substantially invisible in water and having a V shape along a straight junction forming a first and second planar vane positioned at an obtuse angle with respect to each other and a hole centrally disposed through said junction for the passage of a screw shank, the first said vane having a predetermined area and the second vane having a predetermined greater area, a screw eye for the attachment of a line having a shank positioned through said hole and threaded through the center of said recess in said body and colinear with the axis thereof for holding said activating member in said recess, a fish line secured to said screw eye for motivating said lure whereby said activating member may be selectively positioned with said second vane upward with respect to said axis or downward therefrom corresponding with surface or depth activation of said lure respectively when motivated by said line.

* * * * *